United States Patent
Wake et al.

(10) Patent No.: US 11,731,271 B2
(45) Date of Patent: Aug. 22, 2023

(54) VERBAL-BASED FOCUS-OF-ATTENTION TASK MODEL ENCODER

(71) Applicant: Microsoft Technology Licensing, LLC, Redmond, WA (US)

(72) Inventors: Naoki Wake, Tokyo (JP); Kazuhiro Sasabuchi, Tokyo (JP); Katsushi Ikeuchi, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 453 days.

(21) Appl. No.: 16/916,343

(22) Filed: Jun. 30, 2020

(65) Prior Publication Data
US 2021/0402593 A1    Dec. 30, 2021

(51) Int. Cl.
| | |
|---|---|
| *B25J 9/16* | (2006.01) |
| *G06V 40/20* | (2022.01) |
| *G06V 40/10* | (2022.01) |
| *G06V 20/00* | (2022.01) |
| *G06T 7/20* | (2017.01) |
| *B25J 13/00* | (2006.01) |

(52) U.S. Cl.
CPC .............. *B25J 9/1661* (2013.01); *B25J 9/161* (2013.01); *B25J 13/003* (2013.01); *G06T 7/20* (2013.01); *G06V 20/00* (2022.01); *G06V 40/107* (2022.01); *G06V 40/28* (2022.01); *G06T 2207/10024* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 8,958,912 B2* | 2/2015 | Blumberg | .............. | B25J 9/1682 |
| | | | | 700/259 |
| 8,972,445 B2 | 3/2015 | Gorman et al. | | |
| 9,302,393 B1* | 4/2016 | Rosen | .................... | G06N 3/008 |
| 9,821,461 B1* | 11/2017 | Urata | .................... | B25J 9/1674 |

(Continued)

OTHER PUBLICATIONS

Liu, et al., "Jointly Learning Grounded Task Structures from Language Instruction and Visual Demonstration", In Proceedings of the Conference on Empirical Methods in Natural Language Processing, Nov. 1, 2016, pp. 1482-1492.

(Continued)

*Primary Examiner* — Ricky Chin

(57) ABSTRACT

Traditionally, robots may learn to perform tasks by observation in clean or sterile environments. However, robots are unable to accurately learn tasks by observation in real environments (e.g., cluttered, noisy, chaotic environments). Methods and systems are provided for teaching robots to learn tasks in real environments based on input (e.g., verbal or textual cues). In particular, a verbal-based Focus-of-Attention (FOA) model receives input, parses the input to recognize at least a task and a target object name. This information is used to spatio-temporally filter a demonstration of the task to allow the robot to focus on the target object and movements associated with the target object within a real environment. In this way, using the verbal-based FOA, a robot is able to recognize "where and when" to pay attention to the demonstration of the task, thereby enabling the robot to learn the task by observation in a real environment.

19 Claims, 10 Drawing Sheets

(56) References Cited

U.S. PATENT DOCUMENTS

| | | | | |
|---|---|---|---|---|
| 9,868,208 | B2 | 1/2018 | Meier | |
| 9,977,965 | B1* | 5/2018 | Parikh | B25J 9/1697 |
| 10,792,810 | B1* | 10/2020 | Beckman | B25J 9/163 |
| 10,981,272 | B1* | 4/2021 | Nagarajan | B25J 9/1669 |
| 2001/0020837 | A1* | 9/2001 | Yamashita | G06N 3/008 |
| | | | | 704/E15.045 |
| 2013/0346348 | A1* | 12/2013 | Buehler | G05B 19/423 |
| | | | | 901/31 |
| 2014/0012415 | A1* | 1/2014 | Benaim | G06V 40/28 |
| | | | | 700/255 |
| 2016/0221190 | A1* | 8/2016 | Aloimonos | G06F 40/30 |
| 2017/0203436 | A1* | 7/2017 | Wei | B25J 9/161 |
| 2017/0348854 | A1* | 12/2017 | Oleynik | B25J 9/16 |
| 2020/0094397 | A1* | 3/2020 | Young | A61B 5/0205 |
| 2020/0121125 | A1* | 4/2020 | Zito | G06T 7/73 |
| 2020/0311397 | A1* | 10/2020 | Sawhney | G09B 5/02 |
| 2020/0338736 | A1* | 10/2020 | Hoshiyama | B25J 9/1679 |
| 2021/0081752 | A1* | 3/2021 | Chao | G06N 3/08 |
| 2021/0201183 | A1* | 7/2021 | Natarajan | B25J 9/1669 |
| 2021/0271928 | A1* | 9/2021 | Eyster | G06T 7/246 |
| 2021/0334599 | A1* | 10/2021 | Pirk | G05B 13/027 |
| 2021/0402593 | A1* | 12/2021 | Wake | G06T 7/20 |
| 2022/0036302 | A1* | 2/2022 | Cella | G06N 3/047 |

OTHER PUBLICATIONS

Nicolescu, et al., "Natural Methods for Robot Task Learning: Instructive Demonstrations, Generalization and Practice", In Proceedings of the second International joint conference on Autonomous agents and multiagent systems, Jul. 14, 2003, 8 Pages.

Tan, et al., "Towards Embodied Scene Description", In Publication of arXiv preprint arXiv:2004.14638, Apr. 30, 2020, 21 Pages.

Zimmermann, et al., "3D Human Pose Estimation in RGBD Images for Robotic Task Learning", In Proceedings of IEEE International Conference on Robotics and Automation, May 21, 2018, 7 Pages.

Abolghasemi, et al., "Pay Attention!—Robustifying a Deep Visuomotor Policy through Task-Focused Attention", In Repository of arXiv:1809.10093v1, Sep. 26, 2018, 8 Pages.

Kuniyoshi, et al., "Learning by Watching: Extracting Reusable Task Knowledge from Visual Observation of Human Performance", In IEEE Transactions on Robotics and Automation, vol. 10, Issue 6, Dec. 1, 1994, pp. 799-821.

"International Search Report and Written Opinion Issued in PCT Application No. PCT/US21/031470", dated Aug. 16, 2021, 12 Pages.

Stepputtis, et al., "Imitation Learning of Robot Policies by Combining Language, Vision and Demonstration", In Repository of arXiv:1911.11744v1, Nov. 26, 2019, 6 Pages.

\* cited by examiner

VERBAL-BASED FOCUS-OF-ATTENTION TASK MODEL ENCODER

BACKGROUND

Learning-from-Observation (LFO) is a machine learning model that observes and maps human movements into motor commands for a robot, a machine, an agent, a virtual robot, a virtual machine or a virtual agent to perform. The LFO model receives visual information to teach a robot to perform a specific instruction. In a traditional LFO framework, the model learns a person's movements while in teaching mode, i.e., a mode where the robot is "observing" physical movements of a human to assign the movements to a task (or task sequence). The observed or learned human movements are encoded using a task model, e.g., a set of code that when executed causes the robot to perform a physical task (or task sequence). For example, if the LFO system witnesses a person, "pick up a cup and place it on a table," the learned behavior is encoded in a task model that maps the human movements into motor commands that when executed cause a robot to physically pick up a cup and physically place the cup on the table. Such execution of the task model is also known as "decoding" the task mode. In this example, the task sequence is defined in the task model based on a target object (e.g., "cup"), a target position (e.g., "table"), grasp/release actions on the target object ("pick" and "place"), and body configurations associated with the human movement (e.g., hand laterality) for modeling and movement purposes. The robot then calculates the motor commands based on the task model to physically perform the task sequence of "pick up a cup and place it on a table."

A LFO model is an efficient way to reduce robot programming by teaching physical movement through observation. However, traditional LFO systems do not perform well when teaching a robot in real environments. Especially in situations where the robot is in noisy, chaotic, or cluttered spaces. Traditionally, given the connection between the target object and the human movements underlying the task sequence, other objects and unrelated movements in the vicinity of the target object when the task sequence is performed can cause improper correlations between the movements observed and the learned task sequence.

SUMMARY

A computer implemented method is provided in which a robot learns a task (or task sequence) in a cluttered environment based on input (e.g., verbal cues or textual cues). As used herein, the term "robot" may refer to a robot, a machine, an agent, a virtual robot, a virtual machine, a virtual agent, and the like. A "task" is an operation (e.g., one physical movement or one physical action) to generate one state transition. A "task sequence" is a series (or sequence) of tasks. A "state transition" is a transition in a contact state. The system guides a task model encoder by parsing the input to filter the observed human movements and objects. In this way, a robot is able to identify and learn a task (or task sequence) in a cluttered environment using an input-based focus-of-attention (FOA) model; or, in the case of a transcribed verbal cue, a verbal-based focus-of-attention (FOA) model. In particular, the input-based FOA receives input (e.g., one or more verbal cues and/or one or more textual cues), parses the input to recognize a task-related verb (or verbs), a target object name, and an object attribute (if provided in the input). This information is used to spatio-temporally filter a human demonstration of the task (or task sequence) to allow the robot to focus on the target object (and movements associated with the target object) among other objects in the cluttered environment. In this way, using the input-based FOA, a robot (or other machine or agent) is able to learn a task (or task sequence) from observation in a real environment.

In aspects, a computer-implemented method for teaching a robot a task in a cluttered environment is provided. The method includes receiving input and parsing the input to identify a task and a target object name. The method further includes receiving a set of time-series images depicting a demonstration of the task. Based on the target object name, the method includes identifying a target object within the set of time-series images. Additionally, the method includes identifying a timing of at least one physical movement associated with the target object within the set of time-series images and filtering the set of time-series images based on the target object and the timing of the at least one physical movement. The method further includes evaluating the filtered set of time-series images to isolate one or more skill parameters associated with performing the task.

In further aspects, a system including at least one processor and at least one memory communicatively coupled to the at least one processor is provided. The at least one memory may have computer-executable instructions stored thereon, which when executed by the at least one processor may cause the system to perform one or more operations. The operations include receiving a verbal cue and parsing the verbal cue to identify a task and a target object name. The operations further include receiving a set of time-series images depicting a demonstration of the task and detecting a plurality of objects within the set of time-series images. Based on the target object name, the operations include identifying a target object from among the plurality of objects within the set of time-series images. Additionally, the operations include identifying a timing of at least one physical movement associated with the target object within the set of time-series images and filtering the set of time-series images based on the target object and the timing of the at least one physical movement. The operations further include evaluating the filtered set of time-series images to identify one or more skill parameters associated with performing the task.

In still further aspects, a computer-readable storage medium having computer-executable instructions stored thereon is provided. The computer-executable instructions when executed by a processor cause a computer system to perform operations. The operations include receiving input and parsing the input to identify a task and a target object name. The operations further include receiving a set of time-series images depicting a demonstration of the task. Based on the target object name, the operations further include identifying a target object within the set of time-series images and identifying a timing of at least one physical movement associated with the target object within the set of time-series images. Additionally, the operations include filtering the set of time-series images based on the target object and the timing of the at least one physical movement and evaluating the filtered set of time-series images to identify one or more skill parameters associated with performing the task. The operations also include encoding at least the one or more skill parameters as a task model.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In aspects, Learning-from-Observation (LFO) is a machine learning model that observes and maps human movements into motor commands for a robot to perform. A LFO model is an efficient way to reduce robot programming by teaching physical movement through observation. However, traditional LFO systems do not perform well when teaching a robot in real environments—especially in situations where the robot is in noisy, chaotic, or cluttered spaces. Traditionally, given the connection between the target object and the human movements demonstrating the task sequence, other objects and unrelated movements in the vicinity of the target object can cause improper correlations between the human movements observed and the learned task sequence.

In order to address the issues identified above, the present methods and systems enable a robot to learn a task (or task sequence) in a real environment (e.g., cluttered or noisy environment) based on input (e.g., verbal cues and/or textual cues). The system guides a task model encoder by parsing the input to filter the observed human movements and objects. In this way, a robot is able to identify and learn a task (or task sequence) in a cluttered environment using an input-based focus-of-attention (FOA) model (or, a verbal-based FOA model). In particular, the input-based FOA receives input (e.g., one or more verbal cues and/or one or more textual cues), parses the input to recognize a task-related verb (or verbs), a target object name, and an object attribute (if provided in the input). This information is used to spatio-temporally filter a human demonstration of the task (or task sequence) to allow the robot to focus on the target object (and movements associated with the target object) among other objects in the cluttered environment. In this way, using the input-based FOA (or verbal-based FOA), a robot is able to learn a task (or task sequence) from observation in a real environment. As used herein, the term "robot" may refer to a robot, a machine, an agent, a virtual robot, a virtual machine, a virtual agent, and the like, configured to learn a task (or task sequence) based on observation.

Figure 1A:
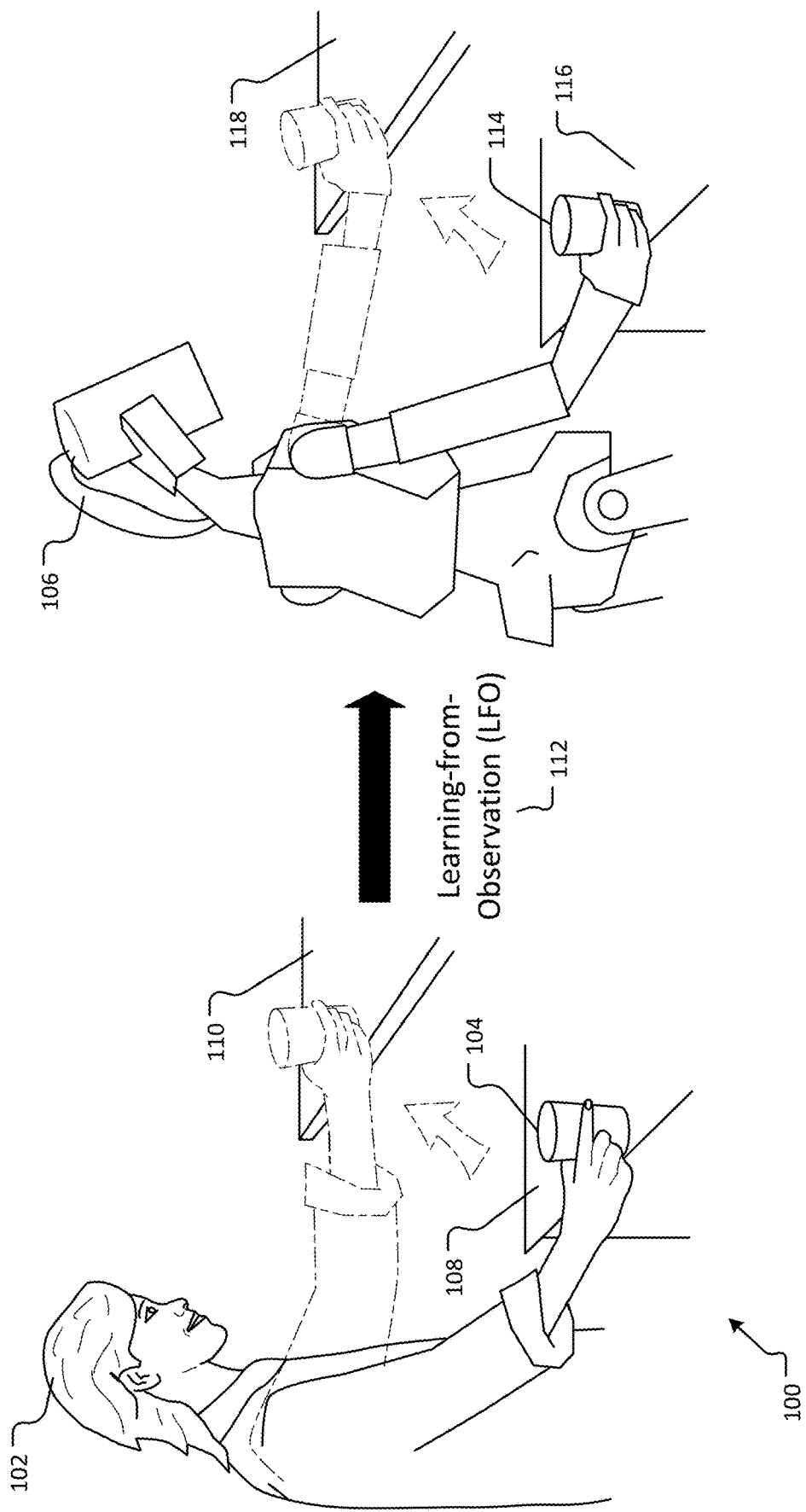
FIG. 1A illustrates an overview of an example system for teaching a robot to perform a task (or task sequence) by observation in a clean environment in accordance with aspects of the present disclosure.

FIG. 1A illustrates an overview of an example system for teaching a robot to perform a task (or task sequence) by observation in a clean environment in accordance with aspects of the present disclosure.

FIG. 1A illustrates a "clean" environment 100 in which a human 102 demonstrates a task (or task sequence) and a robot 106 learns to perform the task (or task sequence) by observing the human 102. As illustrated, the task sequence is performed on an object (e.g., target object), such as cup 104. The task sequence involves "picking up" the cup 104 from table 108 and "placing" the cup 104 on shelf 110. To learn the task sequence, the robot 106 observes the human 102 picking up the cup 104 from table 108 and placing the cup 104 on the shelf 110. The robot 106 then performs the task sequence of picking up a cup 114 from a table 116 and placing the cup 114 on a shelf 118 based on Learning-from-Observation (LFO) 112.

In a traditional LFO framework, a human demonstration of a task (e.g., a grasp task) or a task sequence (e.g., a series of tasks associated with picking up a cup and placing the cup on a shelf) is performed in a clean environment (e.g., an environment devoid of other objects, motions, or sounds). As noted above, a "task" is an operation (one physical action or one physical movement) that causes one state transition. Based on observing the demonstration, each task may be modeled (or represented) in one task model based on the one state transition and various skill parameters. The task model identifies the types of parameters (also known as "skill parameters") that are necessary to achieve the task (e.g., the physical movement that causes the state transition). For instance, for a grasp task, skill parameters may include where to grasp, use of either left or right hand, and the like. A task model encoder encodes a task model for each task of the task sequence by encoding the state transition and skill parameters for execution by a robot. A task model decoder associated with the robot then decodes each task model to calculate motor commands for performing the task sequence.

Figure 1B:
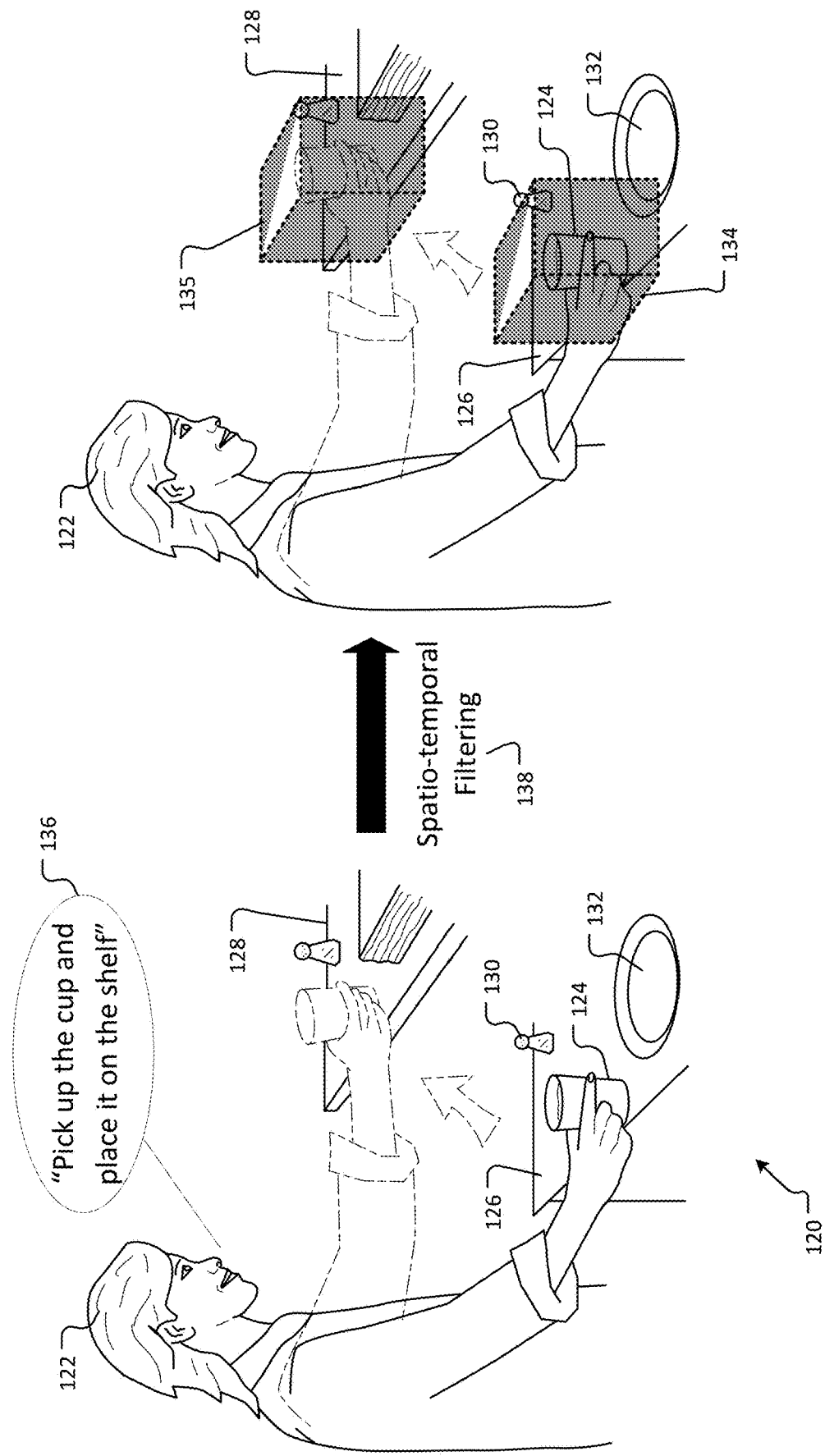
FIG. 1B illustrates an overview of an example system for spatio-temporally filtering a human demonstration of a task (or task sequence) in a real environment in accordance with aspects of the present disclosure.

FIG. 1B illustrates an overview of an example system for spatio-temporally filtering a human demonstration of a task (or task sequence) in a real environment in accordance with aspects of the present disclosure.

FIG. 1B illustrates a "real" (e.g., cluttered, noisy, chaotic) environment 120 in which a human 122 demonstrates a task sequence involving "picking up" a cup 124 from table 126 and "placing" the cup 124 on shelf 128. However, in this case, additional objects are illustrated on table 126, such as salt shaker 130 and plate 132. Thus, to aid the robot in focusing on the target object (e.g., cup 124), spatio-temporal filtering 138 of the human demonstration may be performed.

In aspects, the human demonstration of the task sequence in environment 120 may be recorded as a set of time-series images. The time-series images may be RGB-D images, which include RGB color information with per-pixel depth information. To increase efficiency of the object recognition, pre-processing may be performed by cropping the set of time-series images using a minimum rectangle area that includes all of the detected hand positions of the human during the demonstration. Thereafter, the images may be further cropped to form a bounding box around each detected object, converting the bounding box into a point cloud represented by an environmental coordinate, and calculating a mean value of the point cloud as a 3D position for each detected object. A color attribute for each detected object may be determined by searching a dominant pixel color in the hue, saturation, value (HSV) color space of the cropped time-series images. Each detected object may then be represented in four-dimensional (4D) space (e.g., spatial/temporal space based on the 3D position and a one-dimensional (1D) time attribute extracted from the time-series images) along with a color attribute.

Based on the above processing, a first object may be identified as a "cup" (e.g., cup 124), a second object may be identified as a shaker (e.g., salt shaker 130), and third object may be identified as a plate (e.g., plate 132). In aspects, an object may be recognized by an object name (or object type), such as a cup, a plate, a shaker, and the like. While the illustrated example does not include visible colors, this should not be understood to be limiting. Rather, in addition to recognizing an object name, a color attribute for each object may be determined. For instance, the first object may be identified as a "red cup," the second object may be identified as a "blue plate," and the third object may be identified as a "white shaker" (or, salt shaker).

As further illustrated by FIG. 1B, human 122 may provide input 136, which states, "Pick up the cup and place it on the shelf." In aspects, input 136 may be a verbal cue, a textual cue, or other type of input. As will be described further below, input 136 may be parsed to identify one or more task-related verbs, a target object name (or object type), and an object attribute. In this example, the task-related verbs may be identified as "pick up" and "place." The grammatical object of the first task-related verb may be identified as a "cup" and the grammatical object of the second task-related verb may be identified as "it" (a pronoun representative of the cup). Thus, "cup" may be identified as the target object name (or object type). In this case, the input does not include an adjective modifying the target object, so an object attribute may not be identified.

In response to identifying the target object, the set of time-series images may be spatially filtered (or cropped) to focus on portions of the images that contain the target object (e.g., the cup). For example, the target object in each image may be mapped to a three-dimensional (3D) voxel space as time-series data. As used herein, a "voxel" may be associated with a point defined by a position (e.g., x,y,z coordinates), a color, and a density within the 3D space captured by the RGB-D images. The plurality of voxels may form the 3D voxel space (or voxel grid) within which the objects may be identified. In one implementation, a voxel may correspond to a 0.3 meter (m) regular polygon (based on a scale correlating physical distances to the images).

In some cases, the set of time-series images may be spatially filtered to identify voxels within the voxel grid associated with the target object. In this way, the spatially filtered images may be analyzed to identify human movements in proximity to the target object (e.g., a proximity of 0.2 m or less). As should be appreciated, human movements (e.g., grasping and releasing) associated with performing the task sequence of "picking" and "placing" the target object occur in proximity to the target object. Thus, by spatially filtering the time-series images, the robot may be aided to focus on "where" to pay attention to the demonstration.

As illustrated, first voxel 134 places focus on a portion of a first image containing cup 124 at a first time, and second voxel 135 places focus on a portion of a second image containing cup 124 at a second time, where the first image and the second image are different images of the set of time-series images. As detailed above, a size of a voxel may be selected as a 0.3 meter (m) regular polygon. Thus, based on a size of cup 124, a single voxel may encompass cup 124. In other aspects, depending on a size of the target object and/or a selected size of a representative voxel, a plurality of voxels (e.g., voxel grid) may encompass the target object. As illustrated, first voxel 134 is associated with a right hand of human 122 grasping cup 124 at the first time, and second voxel 135 is associated with the right hand of human 122 releasing cup 124 on shelf 128 at a second time. That is, the first time ($t_1$) is associated with first voxel 134 of a first image (or first frame) of the set of time-series images, and the second time ($t_2$) is associated with second voxel 135 of a second image (or second frame) of the set of time-series images. For simplicity, voxels associated with cup 124 within intermediate frames (e.g., images showing the human hand grasping the cup in the air between the table 126 and the shelf 128) are not illustrated; however, this should not be understood as limiting. As should be appreciated, first voxel 134 and second voxel 135 focus the system on human movements in proximity to cup 124 based on a premise that a grasp task or a release task associated with a pick and place task sequence would occur near the target object.

After spatially filtering the set of time-series images, the system may temporally filter the set of time-series images. For example, each voxel that includes the target object may be evaluated for times in which a human hand approaches and leaves the target object. Timing candidates may be calculated using the equation:

$$T_i = \mathrm{Argmin}(\mathrm{Distance}(H_t, \mathrm{Obj}_i)),$$

where "i" indicates an index of a 3D spatial voxel, "$T_i$" is a candidate timing in a voxel i, "$H_t$" indicates a hand position at time t, "$\mathrm{Obj}_i$" indicates the object position defined as the median of target object positions in a voxel i, "Argmin"

indicates an operation to obtain the index of the global minimum along the time t, and "Distance" indicates an operation to obtain a Euclidean distance between two positions. In aspects, $T_i$ may be calculated for a left and right hand for each voxel. In further aspects, voxels with a calculated Distance between $H_t$ and $Obj_i$ at timing $T_i$ greater than 0.2 m may be discounted based on the premise that grasp or release actions associated with a pick and place task sequence would occur near the target object.

The system then decides whether a timing candidate, Ti, corresponds with a human movement (e.g., a grasp task or a release task) associated with performing the pick and place task sequence. In one example based on a particular recognition system, the system analyzes an existence probability of the target object before and after Ti and classifies the timing candidates Ti into one of three categories. Timing candidates Ti for which the target object exists before Ti but not after Ti are classified as a grasp timing. Timing candidates Ti for which the target object does not exist before Ti but exists after Ti are classified as a release timing. When the target object exists before and after Ti, the timing candidate Ti is classified as an unrelated timing. In other examples using different recognition systems (e.g., using touch sensors or otherwise), a different set of features may be detected in order to determine grasp and release timings. For each timing candidate Ti classified as either a grasp timing or a release timing, a laterality of the human hand with respect to the target object may be determined. In aspects, the existence probability may be set to 0.5 and, in further aspects, voxel resolution may be fine enough such that a grasp and release does not occur in the same voxel. The set of time-series images may then be further filtered to include the timing candidates Ti classified as either a grasp timing or a release timing, along with the corresponding voxel indexes i and the hand laterality for each timing candidate Ti. Thus, by further temporally filtering the time-series images, the robot may be aided to focus on "when" to pay attention to the demonstration. The combination of spatio-temporal filtering of the set of time-series images enables the robot to focus on both "where and when" to pay attention to the demonstration.

Figure 1C:
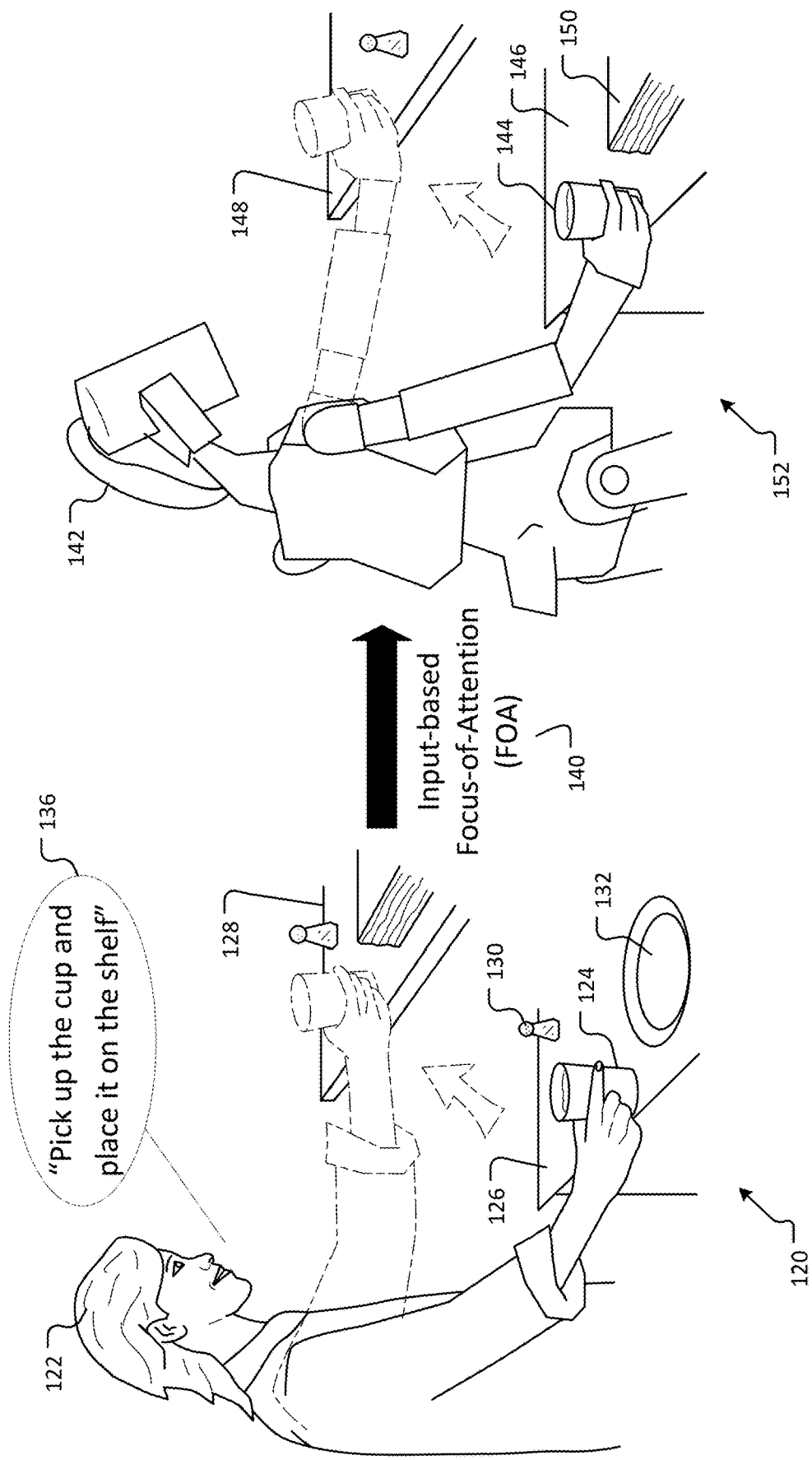
FIG. 1C illustrates an overview of an example system for teaching a robot to perform a task (or task sequence) by observation in a real environment in accordance with aspects of the present disclosure.

FIG. 1C illustrates an overview of an example system for teaching a robot to perform a task (or task sequence) by observation in a real environment in accordance with aspects of the present disclosure.

FIG. 1C is a continuation of FIG. 1B, illustrating a "real" (e.g., cluttered, noisy, chaotic) environment 120 in which a human 122 demonstrates a task sequence involving "picking up" cup 124 from table 126 and "placing" the cup 124 on shelf 128. As with FIG. 1B, additional objects are illustrated on table 126, such as salt shaker 130 and plate 132. Based on the processing described in FIG. 1B, including parsing the input 136 and spatio-temporally filtering 138 the time-series images of the human demonstration of the task sequence (collectively, input-based Focus-of-Attention 140), a robot 142 performs the task sequence of picking up a cup 144 from table 146 and placing it on shelf 148. As illustrated, the robot 142 performs the task sequence within a real environment (e.g., environment 152), which includes additional object(s) on table 146, such as book 150.

In general, robot 142 detects a plurality of objects in a cluttered space or environment. Based on input (e.g., a verbal cue, textual cue, or other input) and a human demonstration, the system performs processing (i.e., input-based FOA 140) to focus the robot 142 on where and when in the human demonstration to pay attention in order to learn a task (or task sequence) within the cluttered (e.g., real) environment. In particular, as described above, robot 142 may receive input 136 to perform a task sequence, e.g., "Pick up the cup and place it on the shelf." The robot may also record a human demonstration of the task sequence as a set of time-series images. The input-based FOA 140 parses the input 136 to identify one or more task-related verbs, a target object name (or object type), and an object attribute. In this example, the task-related verbs may be identified as "pick up" and "place." The grammatical object of the first task-related verb may be identified as a "cup" and the grammatical object of the second task-related verb may be identified as "it" (a pronoun representative of the cup). Thus, "cup" may be identified as the target object name (or object type). In this case, the input does not include an adjective modifying the target object, so an object attribute may not be identified.

As described above, in response to identifying the target object, the set of time-series images may be spatially filtered (or cropped) to focus on portions of the images that contain the target object (e.g., the cup). Thus, based on the input 136, objects like the plate 132 and salt shaker 130 are considered spatial noise and unrelated to the demonstration. By spatially filtering the time-series images, the robot may be aided to focus on "where" within a cluttered environment to pay attention to the human demonstration. Additionally, the set of time-series images may be temporally filtered to identify images including either a grasp timing or a release timing, along with the hand laterality for each grasp or release. Any movement unrelated to moving the cup 124 to the shelf 128 are considered temporal noise and will also be ignored. Temporal noise is any unrelated movement to performing the task sequence of picking up a cup and placing it on a shelf. By further temporally filtering the time-series images, the robot may be aided to focus on "when" to pay attention to the human demonstration. Thus, the combination of spatio-temporal filtering of the set of time-series images enables the robot to focus on both "where and when" to pay attention to the demonstration.

Once the robot knows "where and when" to pay attention, a task model encoder identifies skill parameters associated with the grasp and release actions, including corresponding hand laterality. The skill parameters may then be encoded in a task model defining the task sequence of picking up and placing a cup on a shelf. The robot 142 then decodes the task model to calculate motor commands based on the encoded skill parameters, thereby enabling the robot 142 to perform the task sequence of "picking up the cup 144 and placing it on shelf 148." In this way, the input-based FOA 140 enables robot 142 to learn a task (or task sequence) in a real environment 120.

Figure 2:
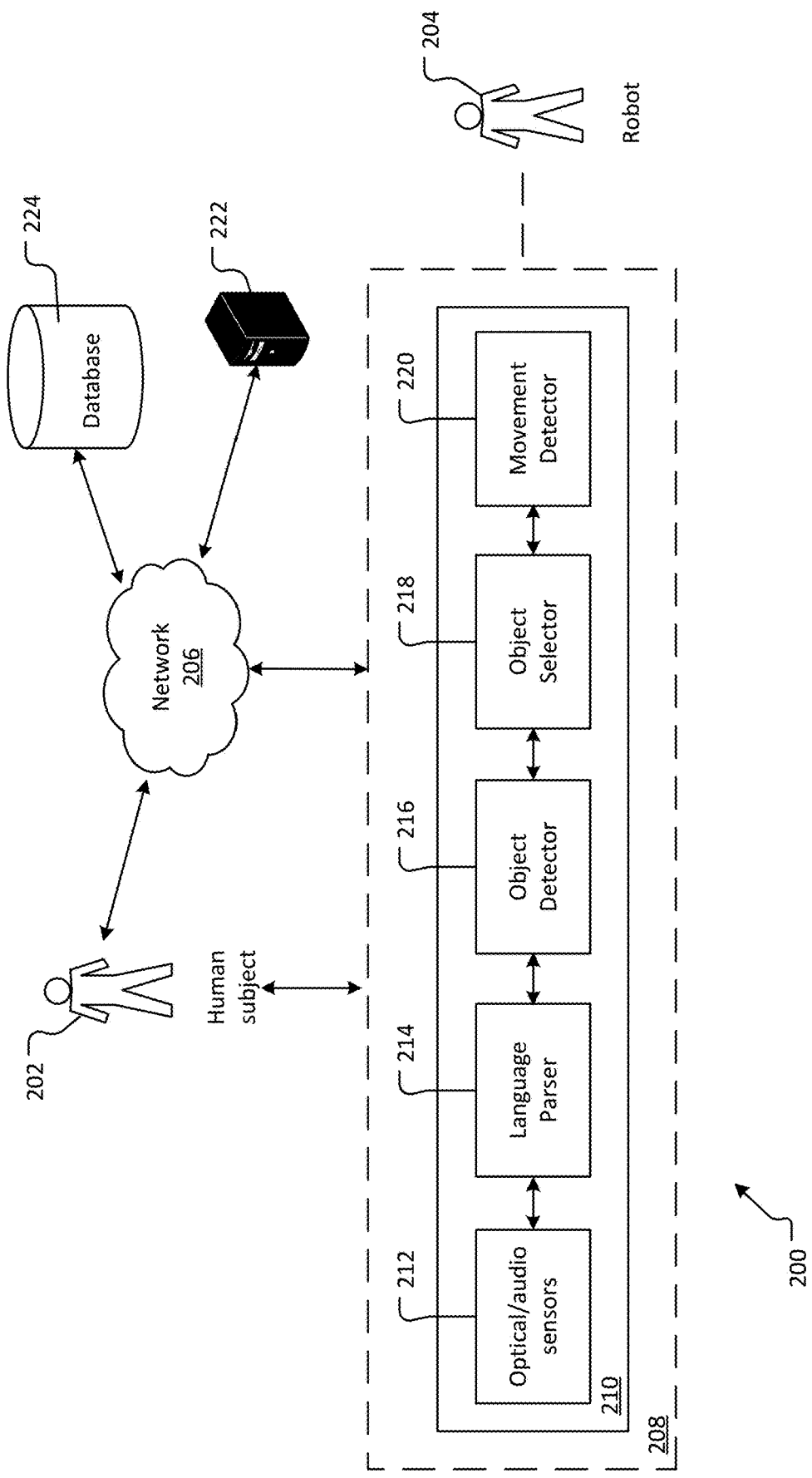
FIG. 2 is a block diagram illustrating a system for teaching a robot to perform a task (or task sequence) by observation in a real environment in accordance with aspects of the present disclosure.

FIG. 2 is a block diagram illustrating a system for teaching a robot to perform a task (or task sequence) by observation in a real environment in accordance with aspects of the present disclosure.

FIG. 2 is a block representation of a system, displaying a robot 204, a human 202, and the modules of an input-based FOA 210 executed by a computing system 208 associated with robot 204. The system 200 illustrates robot 204 and its interaction with a human 202. In one example, robot 204 may interact directly with human 202. For instance, human 202 may provide input (e.g., a verbal cue and/or a textual cue) and perform a demonstration of a task (or task sequence) in a same location or environment shared with the robot 204. The robot 204 may record the demonstration of the task (or task sequence) as a set of times series images (e.g., time-series RGB-D images). In another example, the human 202 may provide input (e.g., a verbal cue and/or a textual cue) to the robot 204 from a remote location via network 206. In this case, a recording (e.g., as time-series RGB-D images) of the human 202 demonstrating the task (or task sequence) may also be provided to the robot 204 via network 206.

Robot 204 may include a computer system 208 comprising an input-based FOA 210 having a number of modules. Each module may perform aspects of the input-based FOA 210 based on executing computer-readable instructions. For example, the modules of the input-based FOA 210 may include: image/audio sensors 212, language parser 214, object detector 216, object selector 218, and movement detector 220.

In aspects, the optical/audio sensors 212 may sense interaction with human 202. For example, an audio sensor associated with optical/audio sensors 212 may receive input from a human (e.g., human 202) and an optical sensor associated with optical/audio sensors 212 may observe (e.g., detect and/or record) a demonstration of a task (or task sequence) by a human (e.g., human 202). For example, optical/audio sensors 212 may record the human demonstration as a set of time-series images (e.g., RGB-D images). In some aspects, optical/audio sensors 212 may receive the input and/or observe the demonstration in a cluttered space. For example, human 202 may provide input of: "Pick up the green cup and place it on the shelf." The human 202 (or another human) may demonstrate the task sequence by picking up a green cup from a table and placing it on a shelf. The optical/audio sensors 212 may sense the human (e.g., human 202) providing the input and may sense movements as the human (e.g., human 202) manipulates the green cup in the cluttered space.

The language parser 214 may analyze the input (e.g., verbal cue and/or textual cue) received from human 202 to identify one or more task-related verbs, a target object name (or object type), and an object attribute. In an example, the robot 204 may receive the input via a wireless microphone (not shown) to the optical/audio sensors 212, and language parser 214 may process the input by applying a noise reduction filter, evaluating signal power to detect voice activity, and utilizing a cloud speech recognition service (e.g., associated with servers 222 via network 206) to perform speech recognition on the input. For the input described above, the task-related verbs may be identified as "pick up" and "place." The grammatical object of the first task-related verb may be identified as a "cup" and the grammatical object of the second task-related verb may be identified as "it" (a pronoun representative of the cup). Thus, "cup" may be identified as the target object name (or object type). Additionally, the adjective modifying "cup" within the input may be identified as the object attribute. In aspects, the object attribute distinguishes the target object from other objects of the same object type (e.g., having the same object name, "cup") within a cluttered space.

The object detector 216, evaluates time-series RGB-D images (e.g., recorded by optical/audio sensors 212) to identify one or more objects in the cluttered environment. RGB-D images include RGB color information with per-pixel depth information. In aspects, object detector 216 may communicate with various databases 224 and/or servers 222 via network 206 to recognize the one or more objects. To increase efficiency of the object recognition, object detector 216 may perform pre-processing by cropping the set of time-series images using a minimum rectangle area that includes all of the detected hand positions of the human during the demonstration. Thereafter, the images may be further cropped to form a bounding box around each detected object, converting the bounding box into a point cloud represented by an environmental coordinate, and calculating a mean value of the point cloud as a 3D position for each detected object. A color attribute for each detected object may be determined by searching a dominant pixel color in the hue, saturation, value (HSV) color space of the cropped time-series images. Each detected object may then be represented in four-dimensional (4D) space (e.g., spatial/temporal space based on the 3D position and a one-dimensional (1D) time attribute extracted from the time-series images) along with a color attribute, and sent to the object selector 218.

The object selector 218, identifies the target object from among the objects detected by object detector 216 based on the output of language parser 214. In aspects, object selector 218 may communicate with various databases 224 and/or servers 222 via network 206 to identify the target object. For example, in a cluttered environment including a plate, a cup, and a salt shaker, based on the target object (e.g., cup) and the object attribute (e.g., green) output by the language parser 214, the object selector 218 may identify a green cup within the time-series images. In response to identifying the target object (e.g., the green cup), object selector 218 may spatially filter the set of time-series images to focus on portions of the images that contain the target object (e.g., the green cup). For example, the target object in each image may be mapped to a three-dimensional (3D) voxel space as time-series data. As used herein, a "voxel" may be associated with a point defined by a position (e.g., x,y,z coordinates), a color, and a density within the 3D space captured by the RGB-D images. The plurality of voxels may form the 3D voxel space (or voxel grid) within which the objects are identified. In one implementation, a voxel may correspond to a 0.3 meter (m) regular polygon (based on a scale correlating physical distances to the images). For example, object selector 218 may spatially filter the set of time-series images to identify voxels within the voxel grid associated with the target object. By spatially filtering the time-series images, the object selector 218 aids the robot in focusing on "where" to pay attention to the demonstration (e.g., the particular 3D region of the images occupied by the green cup).

The movement detector 220 (e.g., a grasp-release detector) may analyze the spatially filtered set of time-series images to identify timings when human movements were detected in close proximity to the target object (e.g., within 0.2 m of the target object). In aspects, movement detector 220 may communicate with various databases 224 and/or servers 222 via network 206 to identify the timings. For instance, the movement detector 220 may analyze the spatially filtered images (e.g., the particular region of the images associated with the voxel or voxels occupied by the green cup) to output the timings when a physical movement occurred in proximity to the cup (e.g., a grasp or release occurred).

For example, each voxel that includes the target object may be evaluated for times in which a human hand approaches and leaves the target object. Timing candidates may be calculated using the equation:

$$T_i = \text{Argmin}(\text{Distance}(H_t, \text{Obj}_i)),$$

where "i" indicates an index of a 3D spatial voxel, "$T_i$" is a candidate timing in a voxel i, "$H_t$" indicates a hand position at time t, "$\text{Obj}_i$" indicates the object position defined as the median of target object positions in a voxel i, "Argmin" indicates an operation to obtain the index of the global minimum along the time t, and "Distance" indicates an operation to obtain a Euclidean distance between two positions. In aspects, $T_i$ may be calculated for a left and right hand for each voxel. In further aspects, voxels with a calculated Distance between $H_t$ and $Obj_i$ at timing $T_j$ greater than 0.2 m may be discounted based on the premise that grasp or release actions associated with a pick and place task sequence would occur near the target object.

The system then decides whether a timing candidate, Ti, corresponds with a human movement associated with performing a task (e.g., a grasp task or a release task). For example, the system analyzes an existence probability of the target object before and after Ti and classifies the timing candidates Ti into one of three categories. Timing candidates Ti for which the target object exists before Ti but not after Ti are classified as a grasp timing. Timing candidates Ti for which the target object does not exist before Ti but exists after Ti are classified as a release timing. When the target object exists before and after Ti, the timing candidate Ti is classified as an unrelated timing. For each timing candidate Ti classified as either a grasp timing or a release timing, a laterality of the human hand with respect to the target object may be determined. In aspects, the existence probability may be set to 0.5 and, in further aspects, voxel resolution may be fine enough such that a grasp and release does not occur in the same voxel. The set of time-series images may then be further filtered to include the timing candidates Ti classified as either a grasp timing or a release timing, along with the corresponding voxel indexes i and the hand laterality for each timing candidate Ti. Thus, by further temporally filtering the time-series images, the movement detector 220 aids the robot in focusing on "when" to pay attention to the demonstration. The combination of spatio-temporal filtering of the set of time-series images enables the robot to focus on both "where and when" to pay attention to the demonstration.

As should be appreciated, the various devices, components, etc., described with respect to FIG. 2 are not intended to limit the systems and methods to the particular components described. Accordingly, additional topology configurations may be used to practice the methods and systems herein and/or some components described may be excluded without departing from the methods and systems disclosed herein.

Figure 3:
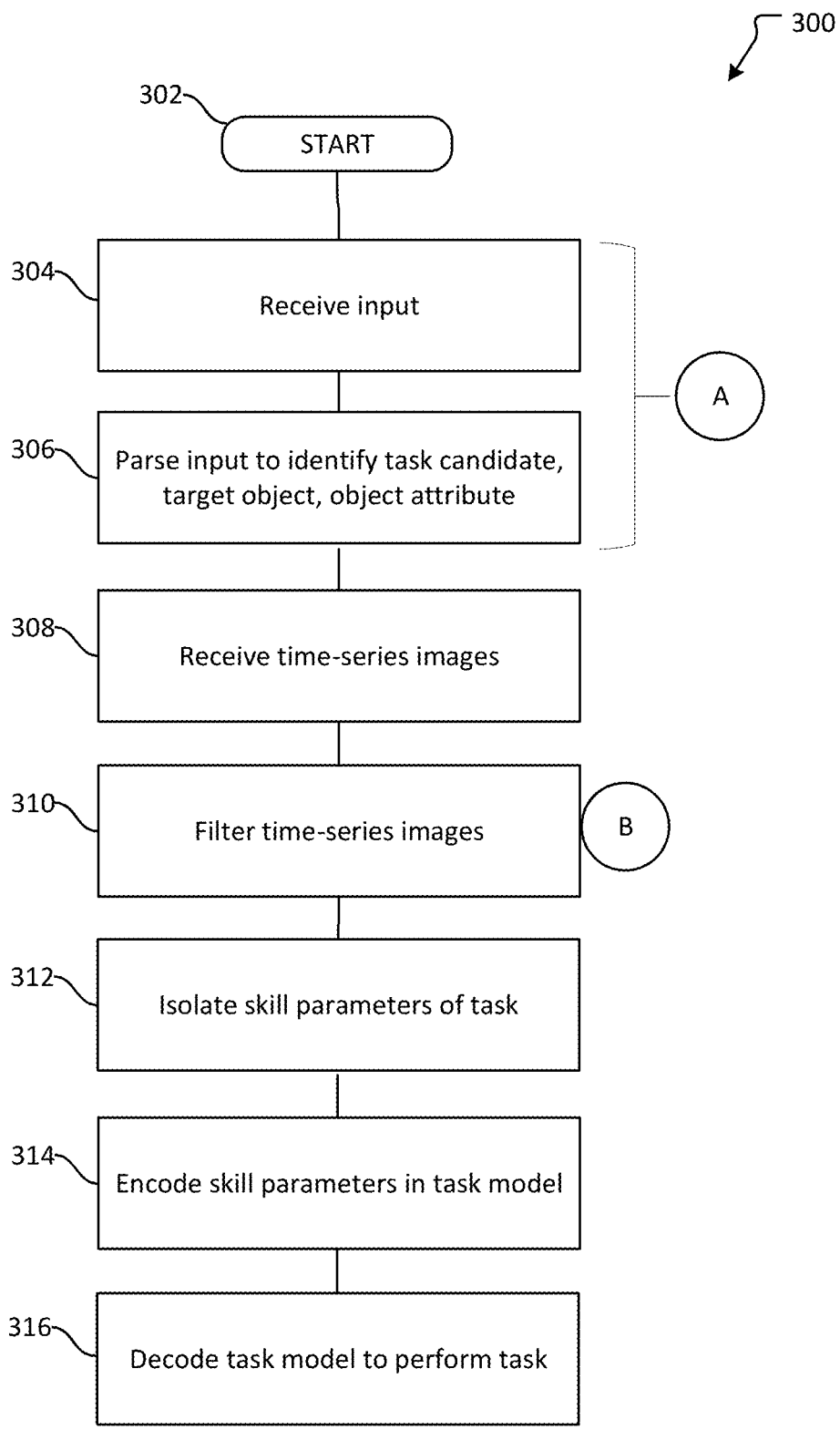
FIG. 3 illustrates an example method of teaching a robot to perform a task (or task sequence) by observation in a real environment in accordance with aspects of the present disclosure.

FIG. 3 illustrates an example method of teaching a robot to perform a task (or task sequence) by observation in a real environment in accordance with aspects of the present disclosure.

A general order of the operations for the method 300 is shown in FIG. 3, beginning with start operation 302. The method 300 may include more or fewer steps or may arrange the order of the steps differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1-2 and 4-7B.

At receive operation 304, a robot may receive input (e.g., a verbal cue and/or textual cue) associated with performing a task (or task sequence). In an example, the input may be a verbal cue received via a wireless microphone to an audio sensor and the input may be processed by applying a noise reduction filter, evaluating signal power to detect voice activity, and utilizing a cloud speech recognition service to perform speech recognition on the verbal cue. A language parser (e.g., language parser 214) of an input-based FOA may receive the input. In an example, the input may be: "Pick up the cup and place it on the shelf." As should be appreciated, a task sequence of picking up a cup and placing it on a shelf is generally described herein; however, as should be appreciated, numerous different tasks (or task sequences) may be learned and performed by a robot, including opening or closing a door (including an interior or exterior structural door, a cabinet door, a refrigerator door, a washer/dryer door, and the like), sweeping a floor with a broom, mopping a floor, folding laundry and placing it in a basket, mowing a lawn, and the like.

At parse operation 306, the input may be parsed (e.g., by language parser 214) to identify one or more task-related verbs, a target object name (or object type), and an object attribute. In this example, the task-related verbs may be identified as "pick up" and "place." Task candidates may be determined from the task-related verbs. Task candidates may include transitions between various contact states for manipulating a target object with respect to other stationary objects (e.g., environmental objects such as a table, a shelf, a floor, and the like), such as non-contact (NC), planar contact (PC), prismatic contact (PR), one-way prismatic contact (OP), revolute contact (RV), one-way revolute contact (OR), and the like. For instance, task-related verbs such as "pick," "pluck," "get," "grab," "take," "remove," "lift," and "raise" may be associated with a task candidate of "PC-NC," which involves transitions from a planar contact (PC) to a non-contact (NC). Task-related verbs such as, "put," "place," "set," "attach," "stow," "latch," "hang," "load," "click," "lay," "restore," "weigh," "chop," "slice," "cut," and "press" may be associated with a task candidate of "NC-PC," which involves transitions from a non-contact (NC) to a planar-contact (PC). Based on the example input above, the first task-related verb ("pick") may be determined to be task candidate "PC-NC," and the second task-related verb ("place") may be determined to be task candidate "NC-PC." A "task" may be defined as an operation (physical action or physical movement) that causes one state transition. The identified task candidates enable the robot to identify human manipulations of a target object (e.g., transitions between contact states) associated with performing a task sequence (e.g., pick and place).

In addition to identifying task-related verbs (and determining corresponding task candidates), parse operation 306 may output a target object and an object attribute from the input. For example, the grammatical object of the first task-related verb may be identified as a "cup" and the grammatical object of the second task-related verb may be identified as "it" (a pronoun representative of the cup). Thus, "cup" may be identified as the target object name (or object type). In the example above, the target object ("cup") may not be modified by an adjective (e.g., a color). Thus, in this case, an object attribute may not be identified from the input.

At receive operation 308, a set of time-series images may be received. For instance, the set of time-series images may be received based on a robot recording a human demonstration of a task (or task sequence). Alternatively, the set of time-series images may be downloaded to the robot via a network based on a human demonstration of the task (or task sequence) performed at a different time or place. In aspects, the set of time-series images may be RGB-D images, which include RGB color information with per-pixel depth information. In some cases, the set of time-series images may depict the human demonstration of the task (or task sequence) in a real environment (such as a cluttered, noisy, or chaotic space). A real environment may include objects in addition to a target object of the task. For instance, based on the example task sequence above, the real environment may include a salt shaker and a plate in addition to the target object (e.g., "cup").

At filter operation 310, the set of time-series images may be filtered based on the input. For instance, in response to identifying the target object, the set of time-series images may be spatially filtered (or cropped) to focus on portions of the images that contain the target object (e.g., the cup). Thus, based on the input, objects like a salt shaker and a plate are considered spatial noise and unrelated to the demonstration. By spatially filtering the time-series images, the robot may be aided to focus on "where" within a cluttered environment to pay attention to the human demonstration. Additionally, the set of time-series images may be temporally filtered to identify images associated with human movements manipulating the target object to perform the task sequence. For instance, human movements for performing the task sequence of "pick and place" may involve "pick" (including a grasp task and a PC-NC task), "carry" (including a NC-NC task), and "place" (including a NC-PC task and a release task). In aspects, a "task sequence" contains a series of tasks that share the same target object and the same manipulating hand (e.g., a pick and place task sequence). Here, a grasp task may be defined as a transition from "no part of an end effector contacts a target object" to "one of any part of the end effector contacts a target object." A release task may be defined as a transition from "one of any part of an end effector contacts a target object" to "no part of the end effector contacts a target object." Here, an "end effector" may refer to a human hand or a robot end effector. Temporal filtering involves filtering the time-series images based on timings of a detected grasp or release and includes capturing hand lateralities for performing the detected grasp or release. By temporally filtering the time-series images, the robot may be aided to focus on "when" to pay attention to the human demonstration and may ignore temporal noise, which includes movements unrelated to performing the task (or task sequence). Thus, the combination of spatio-temporal filtering of the set of time-series images enables the robot to focus on both "where and when" to pay attention to the demonstration.

At isolate operation 312, skill parameters associated with performing the task sequence of "picking and placing" a target object may be isolated. In aspects, skill parameters may relate to the hand manipulations (including hand laterality) observed when performing the task in the spatio-temporal filtered set of time-series images. As noted above, physical movements for performing the task sequence of "pick and place" involve "pick" (including a grasp task and a PC-NC task), "carry" (including a NC-NC task), and "place" (including a NC-PC task and a release task). A "task" may be defined as an operation (physical action or physical movement) that causes one state transition. A "task sequence" is a series of tasks that share the same target object and the same manipulating hand (e.g., a pick and place task sequence). Thus, a "pick and place" task sequence may be decomposed into tasks: grasp task+PC-NC (force-goal task)+NC-NC (position-goal task)+NC-PC (force-goal task)+release task.

From the viewpoint of robotic manipulation, tasks may be classified into three categories, including a position goal task, a force goal task, and a hybrid goal task. A position goal task is a task that achieves a desired state by applying a positional shift to the target object (e.g., NC-NC for moving an object); a force goal task is a task that achieves a desired state by applying force to a target object (e.g., PC-NC for lifting an object); and a hybrid goal task is a task that achieves a desired state by applying positional shift and force to a target object (e.g., PC-PC for scraping with an object). Based on the task category, skill parameters may be defined. For instance, positional parameters are needed to perform a position goal task and force parameters are needed to perform a force goal task, where both positional and force parameters are needed to perform a hybrid goal task. Additionally, body parameters may be included for each task category to mimic human motion characteristics.

As may be appreciated, picking up a cup and moving it to a shelf is a sequence of force-goal tasks (associated with an application of force) and position-goal tasks (associated with a positional shift). In this case, a sequence of the tasks may include grasp-PC-NC-NC-PC-release. To identify position parameters associated with the picking and placing task sequence, isolate operation 312 may extract a manipulating hand trajectory from human skeleton poses between the grasp and release timings of the spatio-temporal filtered set of time-series images. The extracted hand trajectories may be analyzed to obtain position parameters for each task. Additionally, force parameters may be identified for each task. Thus, for grasp, an attaching axis direction and force on the axis may be determined; and for release, a detaching axis direction and force on the axis may be determined. Additionally, for both grasp and release (as well as for other tasks), body parameters may be determined as a spatially discretized human posture by "Labanotation" based on various robot studies, for example.

In addition to the above skill parameters (including position, force, and body parameters), a grasp type, a grasp location, and a release location may be determined for the grasp-release tasks based on processing by the input-based FOA. Grasp type may be determined (or selected by a human) based on the purpose of the pick and place task sequence. For instance, in the case of placing a cup on a shelf with a narrow up/down space, it is reasonable to grasp a side surface of the cup. On the other hand, in the case of placing a cup on top of a tray of other cups, it is reasonable to grasp a top surface of the cup. Based on a human grasp taxonomy, a grasp type may be determined by a rule-based image analysis. The grasp and release locations are defined as locations where the grasp and release occurred in an environment model. The location is obtained as a label of a semantically segmented 3D area such as "above-a-shelf area" by matching the model with the positions of the manipulating hand when the grasp and release occurred. At the time of robot execution (described below), the task model decoder calculates the grasp and release positions inside the locations.

At encode operation 314, the identified skill parameters may be encoded in a task model. In aspects, the skill parameters are encoded as computer-readable instructions that when executed by the robot enable the robot to calculate motor commands for performing the task. In aspects, to perform the task sequence of picking up a cup and placing it on a shelf, encoded skill parameters may include positional parameters, force parameters, body parameters, grasp type, grasp location, and release location.

At decode operation 316, the task model may be decoded by a robot to perform the task sequence of picking up a cup and placing it on a shelf. In aspects, each encoded skill parameter may be executed to calculate one or more motor commands for performing the task. For instance, motor commands may be calculated for implementing the positional parameters, force parameters, body parameters, grasp type, grasp location, and release location associated with performing a task sequence of picking up a cup and placing it on a shelf.

Figure 4:
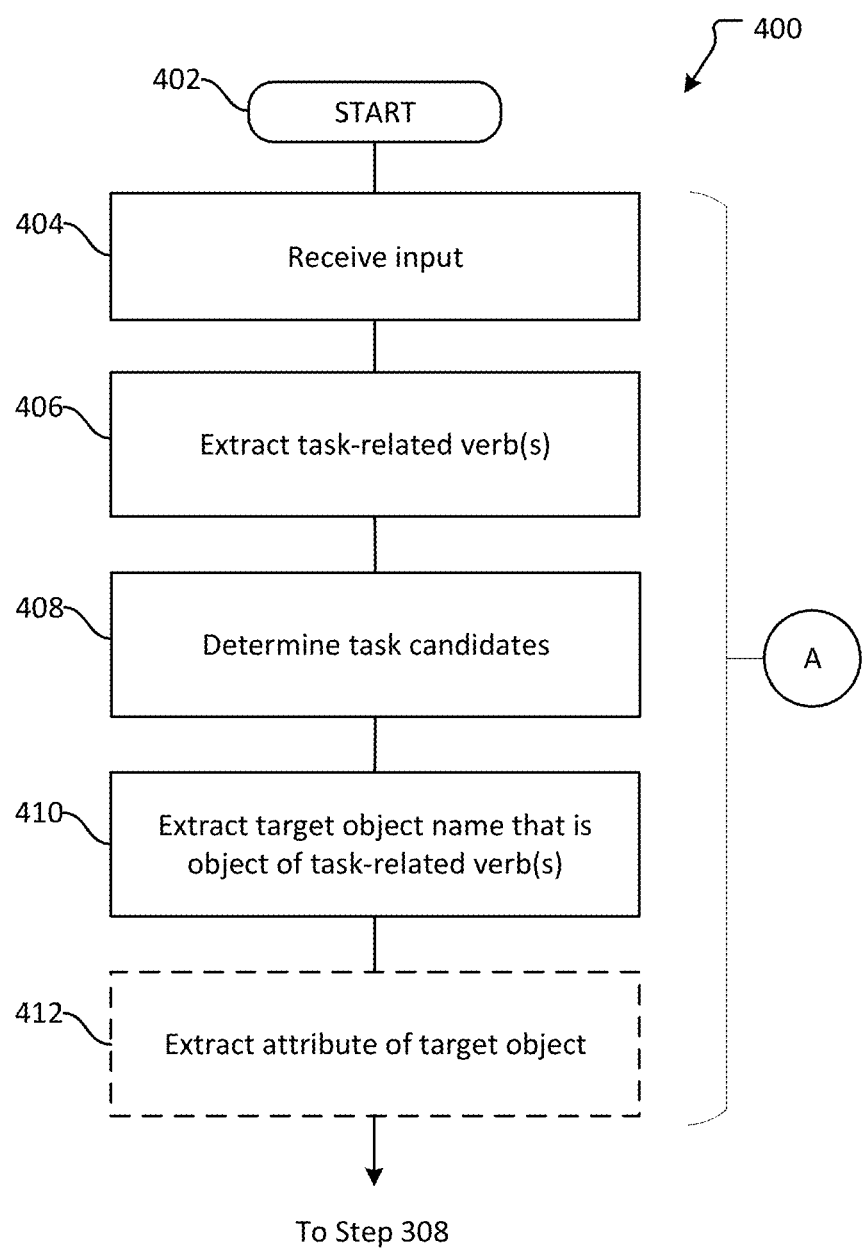
FIG. 4 illustrates an example method of parsing input in accordance with aspects of the present disclosure.
Figure 5:
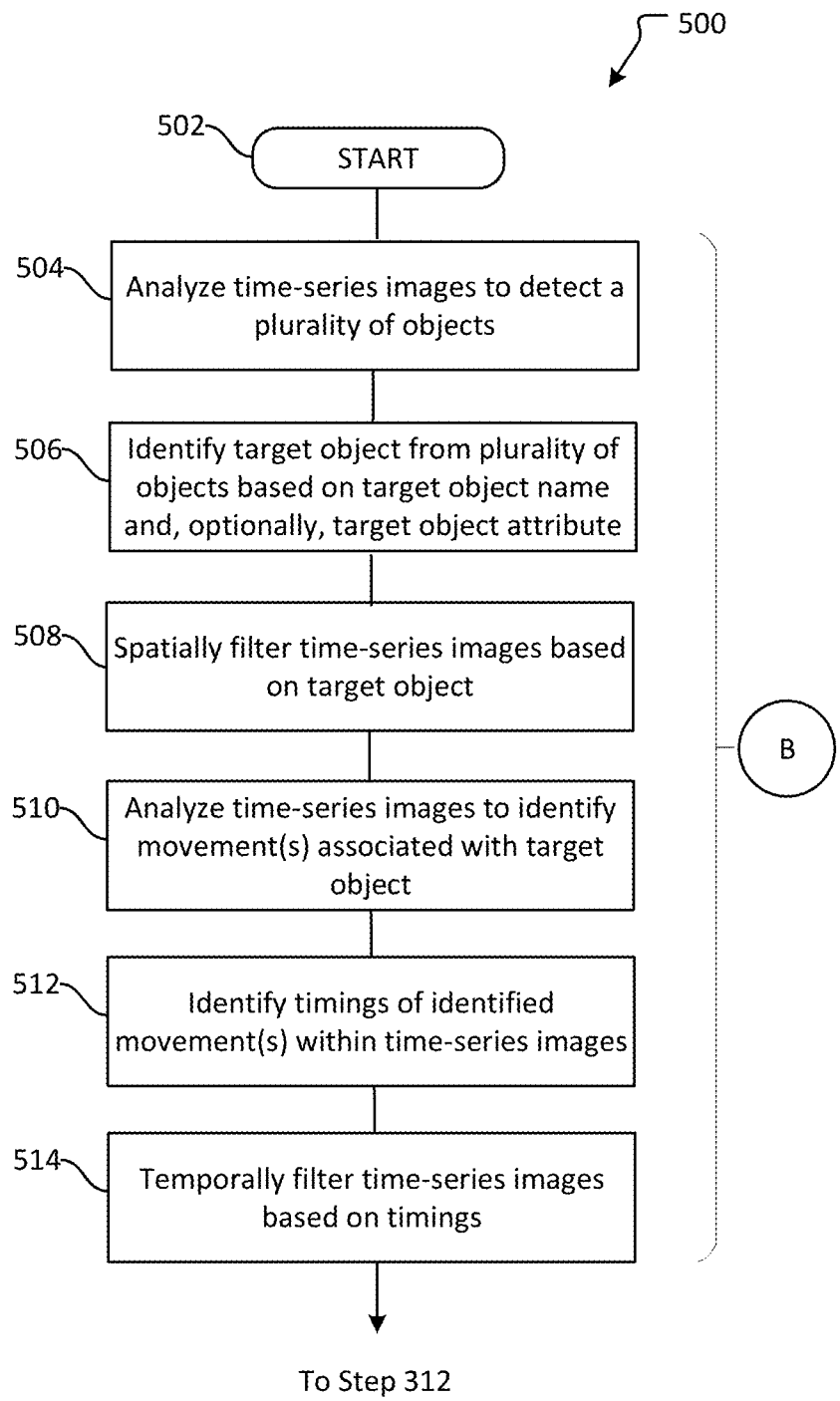
FIG. 5 illustrates an example method of applying spatio-temporal filtering in accordance with aspects of the present disclosure.

In aspects, define receive operation 304 and parse operation 306 are detailed further with respect to FIG. 4 (as indicated by "A") and filter operation 310 is detailed further with respect to FIG. 5 (as indicated by "B").

As should be appreciated, operations 302-316 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 4 illustrates an example method of parsing input in accordance with aspects of the present disclosure.

A general order of the operations for the method 400 is shown in FIG. 4, beginning with start operation 402. Generally, the method 400 illustrates a sequence of operations for receive operation 304 and parse operation 306 of FIG. 3. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1-3 and 5-7B.

At receive operation 404, a robot may receive input (e.g., a verbal cue and/or textual cue) associated with performing a task. In an example, a verbal cue may be received as input via a wireless microphone to an audio sensor and the input may be processed by applying a noise reduction filter, evaluating signal power to detect voice activity, and utilizing a cloud speech recognition service to perform speech recognition on the verbal cue. A language parser (e.g., language parser 214) of an input-based FOA may receive the input. In an example, the input may be: "Pick up the cup and place it on the shelf." As should be appreciated, a task sequence of picking up a cup and placing it on a shelf is generally described herein; however, as should be appreciated, numerous different tasks (or task sequences) may be learned and performed by a robot, including opening or closing a door (including an interior or exterior structural door, a cabinet door, a refrigerator door, a washer/dryer door, and the like), sweeping a floor with a broom, mopping a floor, folding laundry and placing it in a basket, mowing a lawn, and the like.

At extract operation 406, task-related verbs may be extracted from the input. As detailed above, the input may be: "Pick up the cup and place it on the shelf." In this case, a first task-related verb may be identified as "pick up" and a second task-related verb may be identified as "place."

At determine operation 408, task candidates may be determined from the task-related verbs. Task candidates may include various transitions between contact states for manipulating a target object with respect to other stationary objects (e.g., environmental objects such as a table, a shelf, a floor, and the like), such as non-contact (NC), planar contact (PC), prismatic contact (PR), one-way prismatic contact (OP), revolute contact (RV), one-way revolute contact (OR), and the like. For instance, task-related verbs such as "pick," "pluck," "get," "grab," "take," "remove," "lift," and "raise" may be associated with a task candidate of "PC-NC," which involves transitioning from a planar contact (PC) to a non-contact (NC). Task-related verbs such as, "put," "place," "set," "attach," "stow," "latch," "hang," "load," "click," "lay," "restore," "weigh," "chop," "slice," "cut," and "press" may be associated with a task candidate of "NC-PC," which involves transitioning from a non-contact (NC) to a planar-contact (PC). Based on the example input above, the first task-related verb ("pick") may be determined to be task candidate "PC-NC," and the second task-related verb ("place") may be determined to be task candidate "NC-PC." The identified task candidates enable the robot to identify human manipulations of a target object (e.g., transitions between contact states) associated with performing a task sequence (e.g., pick and place).

At extract operation 410, a target object name (or object type) that is the object of the task-related verb(s) may be extracted from the input. A "target object name" identifies a name of an object that is to be manipulated based on the task-related verb(s). For example, the grammatical object of the first task-related verb (e.g., "pick up") may be identified as a "cup" and the grammatical object of the second task-related verb (e.g., "place") may be identified as "it" (a pronoun representative of the cup). Thus, "cup" may be identified as the target object name (or object type).

At optional extract operation 412, an object attribute of the target object may be extracted from the input. An object attribute may be a descriptor of the target object. The object attribute may be an adjective that enables identification of the object within an environment cluttered with multiple objects. For example, a robot may receive input to "pick up the red cup from the table." In this case, a red cup and a green cup may be on the table. By extracting the object attribute, a robot is able to focus on the "red cup" rather than the "green cup." In some cases, an object attribute may not be provided in the input. In this case, while multiple objects may be detected in a cluttered environment, the objects may be differentiated based on the target object name (or object type). After optional extract operation 412, the method may return to receive operation 308 of FIG. 3.

As should be appreciated, operations 402-412 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 5 illustrates an example method of applying spatiotemporal filtering in accordance with aspects of the present disclosure.

A general order of the operations for the method 500 is shown in FIG. 5, beginning with start operation 502. Generally, the method 500 illustrates a sequence of operations for filter operation 310 of FIG. 3. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1-4 and 6-7B.

At analyze operation 504, the time-series images may be analyzed to detect a plurality of objects. For instance, an object detector (e.g., object detector 216) may analyze a set of time-series images (e.g., RGB-D images) to detect the plurality of objects. As detailed above, the set of time-series images may capture a human demonstration of a task within a cluttered environment. As further noted above, RGB-D images include RGB color information with per-pixel depth information. To increase efficiency of the object recognition, pre-processing may be performed by cropping the set of time-series images using a minimum rectangle area that includes all of the detected hand positions of the human during the demonstration. Thereafter, the images may be further cropped to form a bounding box around each detected object, converting the bounding box into a point cloud represented by an environmental coordinate, and calculating a mean value of the point cloud as a 3D position for each detected object. A color attribute for each detected object may be determined by searching a dominant pixel color in the hue, saturation, value (HSV) color space of the cropped time-series images. Each detected object may then be output as a representation in four-dimensional (4D) space (e.g., spatial/temporal space based on the 3D position and a one-dimensional (1D) time attribute extracted from the time-series images) along with a color attribute.

At identify operation 506, a target object may be identified from among the detected plurality of objects based on a target object name and, optionally, a target object attribute. Using the example input above, "Pick up the cup and place it on the shelf," the target object may be identified as "cup." In another example input, "Pick up the red cup and place it on the shelf," the target object may be identified as "cup" and the object attribute may be identified as "red." In a cluttered environment including a plate, a cup, and a salt shaker, based on the target object (e.g., cup), the cup may be identified from among the other objects (e.g., the plate and the salt shaker) within the time-series images. Alternatively, in a cluttered environment including a plate, a green cup, a red cup, and a salt shaker, based on the target object (e.g., cup) and the object attribute ("red"), the red cup may be identified from among the other objects (e.g., the green cup, the plate, and the salt shaker) within the time-series images.

At spatial filter operation 508, in response to identifying the target object (e.g., the cup or the red cup, respectively), the set of time-series images may be spatially filtered to focus on portions of the images that contain the target object (e.g., the cup or the red cup, respectively). For example, the target object in each image may be mapped to a three-dimensional (3D) voxel space as time-series data. As used herein, a "voxel" may be associated with a point defined by a position (e.g., x,y,z coordinates), a color, and a density within the 3D space captured by the RGB-D images. The plurality of voxels may form the 3D voxel space (or voxel grid) within which the objects are identified. In one implementation, a voxel may correspond to a 0.3 meter (m) regular polygon (based on a scale correlating physical distances to the images). In aspects, the set of time-series images may be spatially filtered to identify voxels within the voxel grid associated with the target object. By spatially filtering the time-series images, a robot may be aided in focusing on "where" to pay attention to the demonstration (e.g., the particular 3D region of the images occupied by the cup or the red cup, respectively).

At analyze operation 510, the time-series images may be analyzed to identify one or more physical movements in proximity to the target object. As used herein, a "physical movement" may be defined as a human manipulation with respect to the target object and other stationary or environmental objects. A physical movement that causes a state transition with respect to the target object is associated with a task. For instance, human movements for performing the task sequence of "pick and place" involve "pick" (including a grasp task and a PC-NC task), "carry" (including a NC-NC task), and "place" (including a NC-PC task and a release task). A "task" may be defined as an operation (physical action or physical movement) that causes one state transition. A "task sequence" is a series of tasks that share the same target object and the same manipulating hand (e.g., a pick and place task sequence). Thus, a "pick and place" task sequence may be decomposed into tasks: grasp task+PC-NC (force-goal task)+NC-NC (position-goal task)+NC-PC (force-goal task)+release task. Here, a grasp task may be defined as a transition from "no part of an end effector contacts a target object" to "one of any part of the end effector contacts a target object." A release task may be defined as a transition from "one of any part of an end effector contacts a target object" to "no part of the end effector contacts a target object." Here, an "end effector" may refer to a human hand or a robot end effector. Thus, detecting human movements in proximity to the target object would capture a hand manipulation approaching an object (into proximity of the object) for grasping and a hand manipulation moving away from the object (out of proximity with the object) for releasing.

At identify operation 512, timings associated with the identified physical movement(s) within time-series images may be identified. For instance, the spatially filtered images (e.g., a region of the images associated with the voxel or voxels occupied by the target object) may be analyzed to output the timings when a physical movement occurred in proximity to the target object (e.g., a grasp or release task occurred). For example, each voxel that includes the target object may be evaluated for times in which a human hand approaches and leaves the target object. Timing candidates may be calculated using the equation:

$$T_i = \text{Argmin}(\text{Distance}(H_t, \text{Obj}_i)),$$

where "i" indicates an index of a 3D spatial voxel, "$T_i$" is a candidate timing in a voxel i, "$H_t$" indicates a hand position at time t, "$\text{Obj}_i$" indicates the object position defined as the median of target object positions in a voxel i, "Argmin" indicates an operation to obtain the index of the global minimum along the time t, and "Distance" indicates an operation to obtain a Euclidean distance between two positions. In aspects, $T_i$ may be calculated for a left and right hand for each voxel. In further aspects, voxels with a calculated Distance between $H_t$ and $\text{Obj}_i$ at timing $T_i$ greater than 0.2 m may be discounted based on the premise that grasp or release actions associated with a pick and place task would occur near the target object.

Identify operation 512 then decides whether a timing candidate, Ti, corresponds with a human movement associated with performing the task (e.g., a grasp or a release). For example, the system analyzes an existence probability of the target object before and after Ti and classifies the timing candidates Ti into one of three categories. Timing candidates Ti for which the target object exists before Ti but not after Ti are classified as a grasp timing. Timing candidates Ti for which the target object does not exist before Ti but exists after Ti are classified as a release timing. When the target object exists before and after Ti, the timing candidate Ti is classified as an unrelated timing. For each timing candidate Ti classified as either a grasp timing or a release timing, a laterality of the human hand with respect to the target object may be determined. In aspects, the existence probability may be set to 0.5 and, in further aspects, voxel resolution may be fine enough such that a grasp and release does not occur in the same voxel.

At temporal filter operation 514, the set of time-series images may be further filtered to include the timing candidates Ti classified as either a grasp timing or a release timing, along with the corresponding voxel indexes i and the hand laterality for each timing candidate Ti. Thus, by further temporally filtering the time-series images, the movement detector 220 aids the robot in focusing on "when" to pay attention to the demonstration. The combination of spatiotemporal filtering of the set of time-series images enables the robot to focus on both "where and when" to pay attention to the demonstration. After temporal filter operation 514, the method may return to isolate operation 312 of FIG. 3.

As should be appreciated, operations 502-514 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 6:
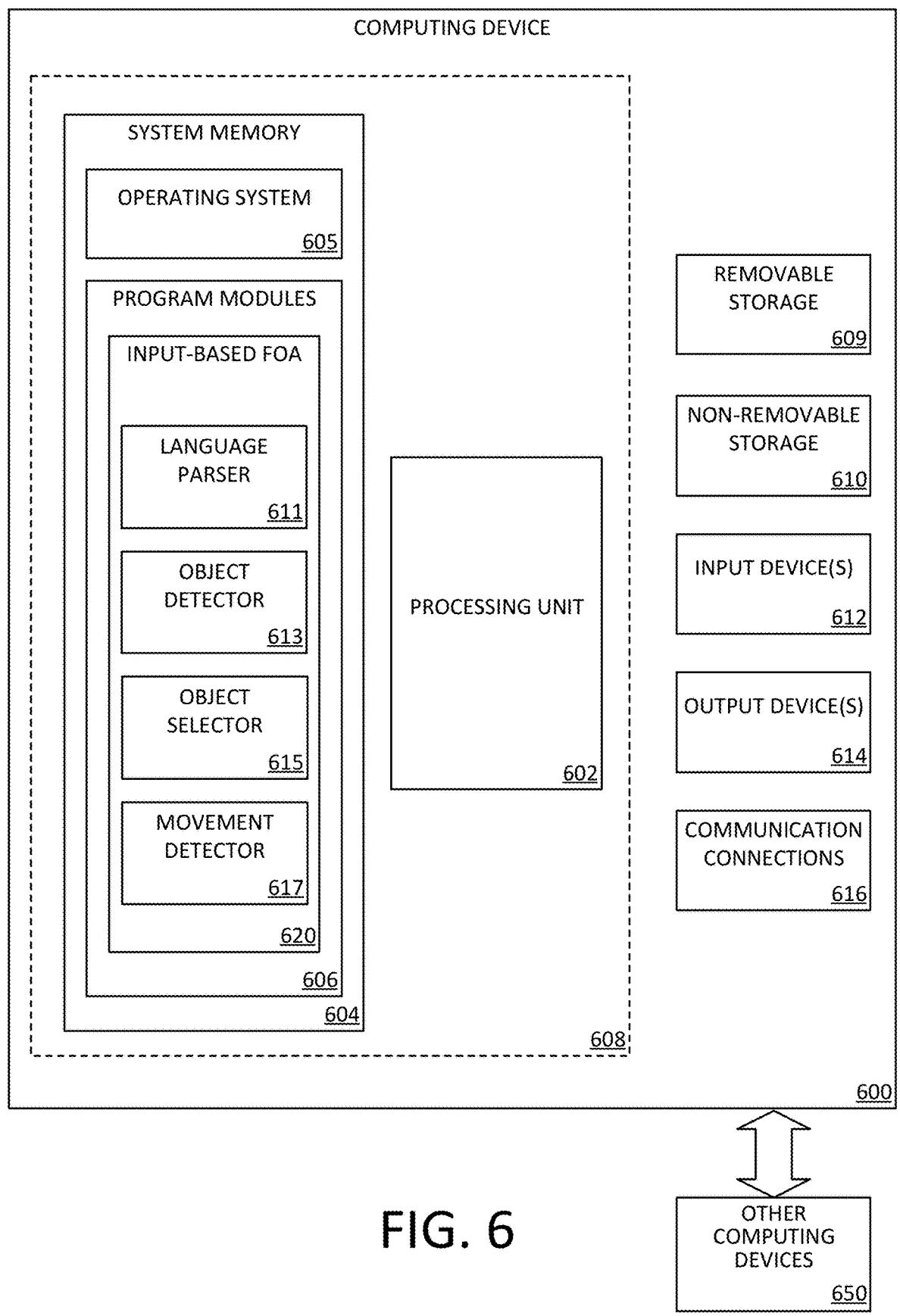
FIG. 6 is a block diagram illustrating physical components (e.g., hardware) of a computing device 600 with which aspects of the disclosure may be practiced.

FIG. 6 is a block diagram illustrating physical components (e.g., hardware) of a computing device 600 with which aspects of the disclosure may be practiced. The computing device components described below may have computer executable instructions for implementing an input-based FOA model 620 (e.g., input-based FOA model 210), including computer executable instructions for a input-based FOA model 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running the input-based FOA model 620, such as one or more components with regard to FIG. 2 and, in particular, a language parser 611 (e.g., language parser 214), an object detector 613 (e.g., object detector 216), an object selector 615 (e.g., object selector 218), and/or a movement detector 617 (e.g., movement detector 220).

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., corresponding to input-based FOA 620) may perform processes including, but not limited to, the aspects, as described herein. Other program modules that may be used in accordance with aspects of the present disclosure, and in particular for teaching a robot to perform a task in a real environment, may include a language parser 611, an object detector 613, an object selector 615, and/or a movement detector 617, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as visual image sensors, audio sensors, a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
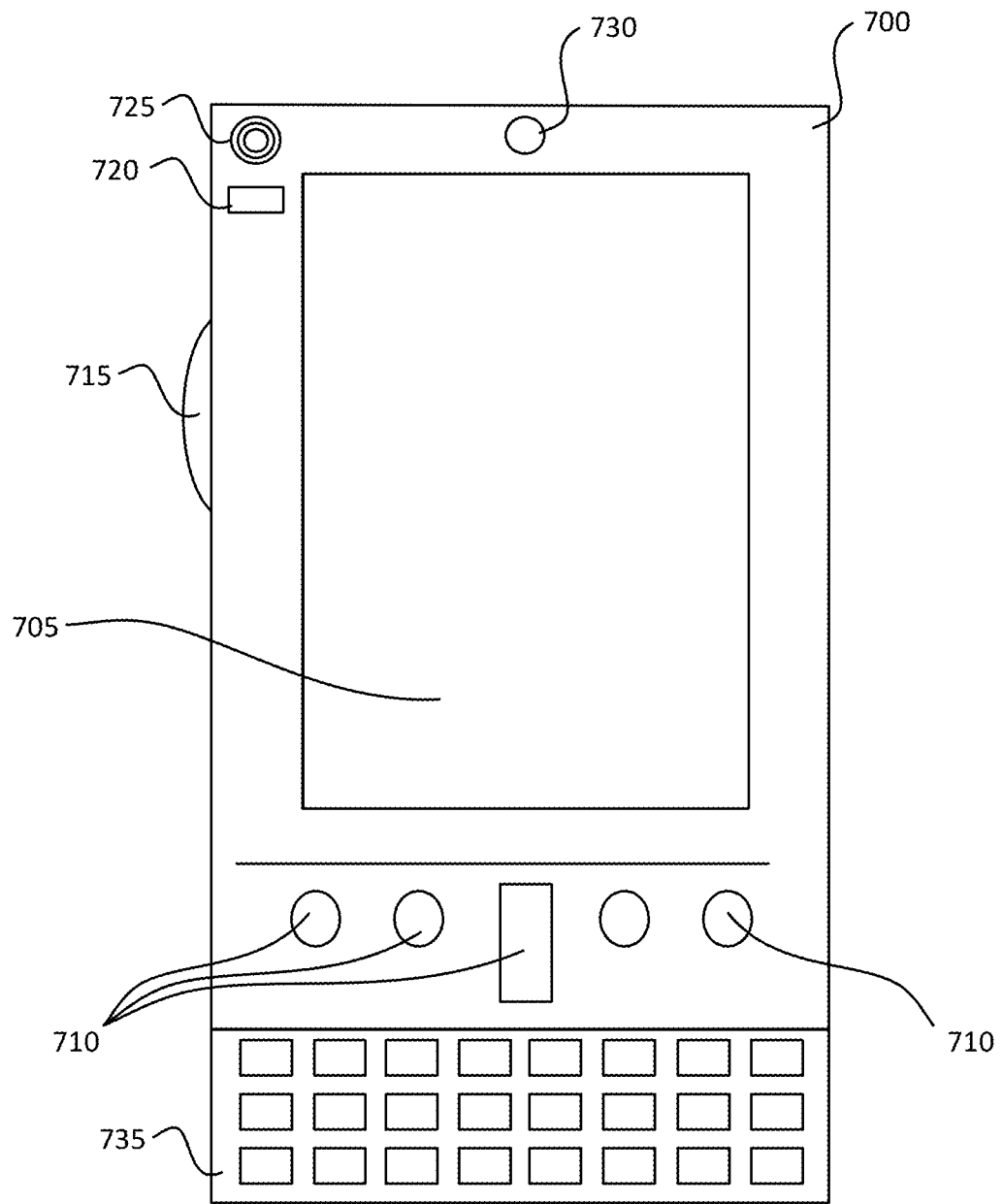
FIG. 7A is a simplified diagram of a mobile computing device with which aspects of the present disclosure may be practiced.
Figure 7B:
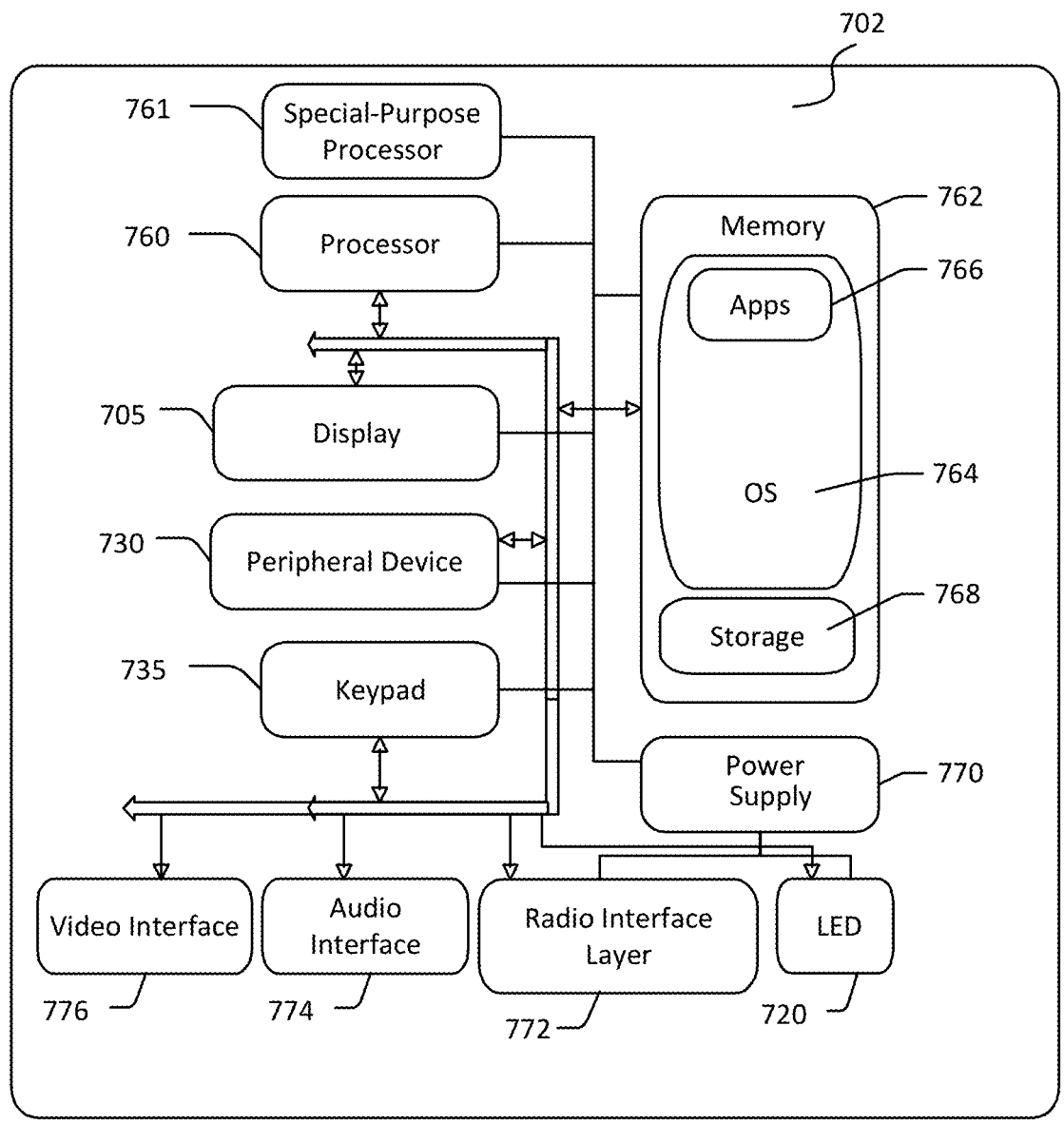
FIG. 7B is another simplified block diagram of a mobile computing device with which aspects of the present disclosure may be practiced.

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing an input-based FOA model as described herein (e.g., language parser, object detector, object selector, and/or movement detector, etc.).

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like. Audio interface 774, video interface 776, and keyboard 735 may be operated to receive input (e.g., a verbal cue or a textual cue, as described herein).

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 7A and 7B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for teaching a robot a task in a cluttered environment, comprising:
    receiving an input;
    parsing the input to identify a task and a target object name;
    receiving a set of time-series images;
    detecting a plurality of objects within the set of time-series images, wherein the set of time-series images depicts a demonstration of the task associated with a target object;
    based on the target object name, identifying the target object among the plurality of objects within the set of time-series images;
    generating a spatially filtered set of time-series images by spatially filtering the set of time-series images based on the target object;
    identifying a timing of at least one physical human movement for performing the task associated with the target object within the spatially filtered set of time-series images;
    generating a spatio-temporal filtered set of time-series images by temporally filtering the spatially filtered set of time-series images based on the timing of the at least one physical human movement; and
    evaluating the spatio-temporal filtered set of time-series images to isolate one or more skill parameters associated with performing the task.

2. The method of claim 1, wherein the set of time-series images are RGB-D images.

3. The method of claim 1, wherein spatially filtering the set of time-series images based on the target object further comprises spatially filtering the set of time-series images to identify one or more voxels associated with the target object.

4. The method of claim 1, further comprising:
    parsing the input to identify an object attribute; and
    based on the target object name and the object attribute, identifying the target object within the set of time-series images.

5. The method of claim 1, wherein temporally filtering the spatially filtered set of time-series images based on the timing of the at least one physical human movement further comprises temporally filtering the spatially filtered set of time-series images to identify one or more voxels associated with times in which a human hand approaches or leaves the target object.

6. The method of claim 1, wherein the at least one physical human movement is associated with one of a grasp task or a release task.

7. The method of claim 1, wherein the task is a sequence of tasks.

8. The method of claim 1, further comprising:
    encoding at least the one or more skill parameters as a task model.

9. The method of claim 8, further comprising:
    decoding the task model to calculate one or more motor commands corresponding to at least the one or more skill parameters for performing the task by a robot.

10. A system comprising:
    at least one processor; and
    at least one memory communicatively coupled to the at least one processor and having computer-executable instructions stored thereon, the computer-executable instructions when executed by the at least one processor causing the system to:
    receive a verbal cue;
    parse the verbal cue to identify a task and a target object name;
    receive a set of time-series images;
    detect a plurality of objects within the set of time-series images, wherein the set of time-series images depicts a demonstration of the task associated with a target object;
    based on the target object name, identify the target object from among the plurality of objects within the set of time-series images;
    generate a spatially filtered set of time-series images by spatially filtering the set of time-series images based on the target object;
    identify a timing of at least one physical human movement for performing the task associated with the target object within the spatially filtered set of time-series images;
    generate a spatio-temporal filtered set of time-series images by temporally filtering the spatially filtered set of time-series images based on the timing of the at least one physical human movement; and
    evaluate the spatio-temporal filtered set of time-series images to identify one or more skill parameters associated with performing the task.

11. The system of claim 10, wherein the set of time-series images are RGB-D images.

12. The system of claim 10, wherein spatially filtering the set of time-series images based on the target object further comprises spatially filtering the set of time-series images to identify one or more voxels associated with the target object.

13. The system of claim 10, wherein temporally filtering the spatially filtered set of time-series images based on the timing of the at least one physical human movement further comprises temporally filtering the set of time-series images to identify one or more voxels associated with times in which a human hand approaches or leaves the target object.

14. The system of claim 10, wherein the at least one physical human movement is associated with one of a grasp task or a release task.

15. A computer-readable storage medium having computer-executable instructions stored thereon, the computer-executable instructions when executed by a processor causing a computer system to:
- receive an input;
- parse the input to identify a task and a target object name;
- receive a set of time-series images;
- detect a plurality of objects within the set of time-series images, wherein the set of time-series images depicts a demonstration of the task associated with a target object;
- based on the target object name, identify the target object among the plurality of objects within the set of time-series images;
- generate a spatially filtered set of time-series images by spatially filtering the set of time-series images based on the target object;
- identify a timing of at least one physical human movement for performing the task associated with the target object within the spatially filtered set of time-series images;
- generate a spatio-temporal filtered set of time-series images by temporally filtering the spatially filtered set of time-series images based on the timing of the at least one physical human movement;
- evaluate the spatio-temporal filtered set of time-series images to identify one or more skill parameters associated with performing the task; and
- encode at least the one or more skill parameters as a task model.

16. The computer-readable storage medium of claim 15, wherein the set of time-series images are RGB-D images.

17. The computer-readable storage medium of claim 15, wherein spatially filtering the set of time-series images based on the target object further comprises spatially filtering the set of time-series images to identify one or more voxels associated with the target object.

18. The computer-readable storage medium of claim 15, wherein temporally filtering the spatially filtered set of time-series images based on the timing of the at least one physical human movement further comprises temporally filtering the set of time-series images to identify one or more voxels associated with times in which a human hand approaches or leaves the target object.

19. The computer-readable storage medium of claim 15, wherein the at least one physical human movement is associated with one of a grasp task or a release task.

\* \* \* \* \*